United States Patent

Graf et al.

[15] 3,641,421

[45] Feb. 8, 1972

[54] COMMUTATION CONTROL FOR INVERTER CIRCUITS

[72] Inventors: Carlton Eugene Graf; Einar Aasen Skogsholm, both of Erie; Werner Karl Volkmann, Fairview, all of Pa.

[73] Assignee: General Electric Company

[22] Filed: Feb. 24, 1971

[21] Appl. No.: 118,402

[52] U.S. Cl. ............................................. 321/12, 321/45 C
[51] Int. Cl. ........................................................ H02m 7/52
[58] Field of Search .............................. 321/11, 12, 43–45 R, 321/45 C

[56] References Cited

UNITED STATES PATENTS

| | | | |
|---|---|---|---|
| 3,119,058 | 1/1964 | Genuit | 321/45 C |
| 3,120,634 | 2/1964 | Genuit | 321/45 C |
| 3,327,200 | 6/1967 | Corey | 321/45 R |
| 3,448,367 | 6/1969 | Corey | 321/45 C |

FOREIGN PATENTS OR APPLICATIONS

| | | | |
|---|---|---|---|
| 68,553 | 8/1969 | Germany | 321/45 C |
| 1,063,733 | 3/1967 | Great Britain | 321/45 C |

*Primary Examiner*—William H. Beha, Jr.
*Attorney*—James C. Davis, Jr., George R. Powers, Frank L. Neuhauser, Oscar B. Waddell and Joseph B. Forman

[57] ABSTRACT

An inverter circuit utilizing gate controlled rectifiers for changing direct-current electric power to alternating-current electric power is provided with commutation control apparatus for sensing commutation current during the commutation of a first load rectifier and firing, or turning "on," another load rectifier in response thereto at a predetermined level of commutation current.

14 Claims, 5 Drawing Figures

COMMUTATION CONTROL FOR INVERTER CIRCUITS

BACKGROUND OF THE INVENTION

1. Field of the Invention

This invention relates to inverter circuits for changing direct-current electric power to alternating-current electric power and, more particularly, to control means for providing rapid and substantially uniform commutation over a broad range of load conditions.

2. Description of the Prior Art

This invention is particularly applicable to the control of commutation in inverter circuits of the type disclosed and claimed by U.S. Pat. No. 3,207,974, to McMurray, dated Sept. 21, 1965, and assigned to the assignee of this invention. While the present invention will be described herein in connection with typical inverter circuits of the type taught by McMurray, a more complete basic understanding of such circuits may be obtained from the McMurray patent.

In inverter circuits of the type taught by McMurray, direct-current electric power is changed, or "inverted," to alternating-current by means of load current carrying gate controlled rectifiers such as silicon controlled rectifiers (SCRs) which are commutated "off" by commutating circuitry including gate controlled commutating rectifiers. By way of example, direct-current power is inverted to single phase alternating-current power by means of a pair of controlled load rectifiers and a commutating circuit including a respective pair of controlled commutating rectifiers, a commutating capacitor, and a commutating inductor. In a multiphase inverter system, similar circuitry is provided for each phase. To commutate a particular load rectifier "off," the respective commutating rectifier is turned "on" to connect a series oscillatory circuit including the associated capacitor and the associated inductor across the load rectifier. A current pulse produced by the discharging series oscillatory circuit takes over the function of supplying the load current, excess commutation current being conducted around the load rectifier by a feedback diode. While the commutation current exceeds the load current, the load rectifier is reversely biased and is turned "off" if the reverse bias lasts for a period greater than the turn-off time of the rectifier. After the commutating capacitor has been charged to an opposite polarity, the commutating rectifier turns "off," and the commutating circuit is now in a condition to commutate the other of the pair of rectifiers.

The usual practice in the operation of this type of inverter circuit is to turn "on" the second load rectifier after the first load rectifier has been turned "off" and the commutating capacitor has been fully recharged. Operation in this manner results in a commutation period that is load dependent, the total time required for commutation increasing with decreasing load current. While this mode of operation is fully satisfactory and desirable for many applications, there are some applications of inverter circuits where extremely rapid commutation is required at all load levels. For example, it may be desirable to control the average voltage level of electric power supplied to a load by means of time ratio switching of load current carrying SCRs as taught by copending application, Ser. No. 81,758, entitled "Adjustable Speed Polyphase AC Motor Drive," filed on Oct. 19, 1970, in the names of Carlton E. Graf and Werner K. Volkmann, and assigned to the assignee of this invention. Heretofore, the rate at which such switching can occur has been limited at low load levels due to the load dependence of the commutation period.

It has been heretofore proposed that the commutating period at low load levels be reduced by firing the noncommutated load rectifier at a predetermined time after the firing of the commutating rectifier, the time being selected such that the commutation current at the time of firing is substantially above the actual load current. This approach theoretically results in a commutation period approximately the same as that which would normally occur at an actual load current equal to the commutation current at the time the noncommutated load rectifier is fired. While this approach can be successful in reducing the commutation period, it is not altogether satisfactory in that it is characterized by poor regulation. More specifically, relatively large variations in commutation time, current and voltage are possible as a result of "pump-up" action (hereinafter described in detail) in combination with commutation component tolerances and variations, supply voltage variations, and time delay variations. Among other things, it is necessary to utilize circuit components capable of operating reliably at the current and voltage extremes which may be reasonably anticipated. If these extremes were reduced through more effective regulation of current and voltage, it would be possible to use components of lower rating and cost.

SUMMARY OF THE INVENTION

It is an object of this invention to provide rapid commutation in inverter circuits over a wide load range, including low load and no load operating conditions.

Another object of this invention is to provide improved commutation for inverter circuits in which the commutation time, voltage and current are substantially independent of the load.

Another object is to provide improved commutation in which the commutation time, voltage and current are regulated so as to remain within desired limits independently of variations in circuit components and supply voltage.

Still another object is to provide improved commutation for inverter circuits in which the commutation control apparatus is self regulating and does not require precise adjustment with variations in circuit components, supply voltage and the like.

Yet another object is to provide improved commutation for inverter circuits in which the commutation is accomplished without undue extremes in voltage and current, thereby permitting the use of lower rated and lower cost circuit components.

Briefly stated, in carrying out the invention in one form, an inverter circuit is provided with commutation control apparatus including means for sensing the commutation current during commutation of a load rectifier and means responsive thereto for turning "on" another load rectifier when the commutation current decays to a predetermined level. The commutation current level at which the noncommutated load rectifier is fired is less than the peak commutation current and preferably within the range of 25 to 50 percent of the peak commutation current. By a further aspect of the invention, the means for turning on the other load rectifier includes switching means having two conductive states and control means for normally maintaining the switching means in on conductive state and for shifting the switching means to the other conductive state and rapidly thereafter back to the first conductive state to produce a control pulse when the commutation current decays to the predetermined level, the control pulse being utilized to fire the noncommutated load rectifier.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
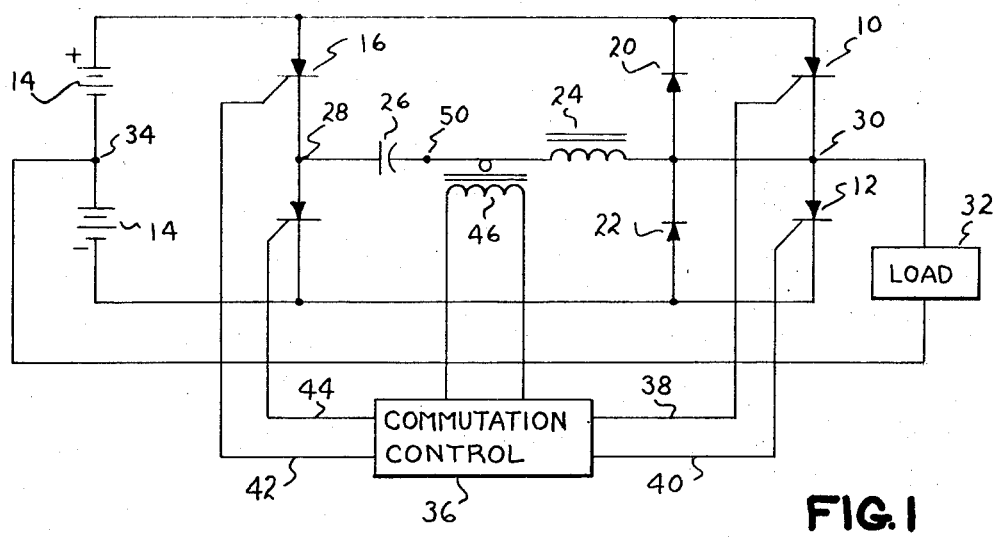
FIG. 1 is of schematic circuit diagram of a single phase inverter power circuit and control apparatus therefor in accordance with this invention.

Referring first to FIG. 1, a single phase inverter circuit of the type disclosed and claimed by the above-identified McMurray patent is illustrated, the power inverter circuit including a pair of load current gate controlled rectifiers 10 and 12 connected in series across a source 14 of direct-current electric power. Gate controlled rectifiers 16 and 18 are also connected in series across the direct-current source 14 with the same polarity as the gate controlled rectifiers 10 and 12. The gate controlled rectifiers 10, 12, 16 and 18 are preferably silicon controlled rectifiers, but it will be obvious that functionally equivalent devices such as gaseous thyratrons can be used. Diode rectifiers 20 and 22 are connected in parallel across the controlled rectifiers 10 and 12, respectively, in reverse polarity, and an inductance 24 and a capacitor 26 are connected in series between the junction 28 of the gate controlled rectifiers 16 and 18 and the junction 30 of the gate controlled rectifiers 10 and 12 and the diode rectifiers 20 and 22. A suitable load 32, such as a single-phase AC motor, is connected between the junction 30 and a terminal 34 of the DC source 14 for receiving alternating-current from the inverter circuit.

As illustrated by FIG. 1, commutation control apparatus 36 is provided for turning on the gate controlled rectifiers 10, 12, 16 and 18 by means of firing signal pulses supplied through connections 38, 40, 42, and 44, respectively. In accordance with the invention, the commutation control apparatus 36 includes a current transformer 46 and associated apparatus for sensing the commutation current and for firing the gate controlled rectifiers 10 and 12 at a predetermined level of commutation current. A detailed description of the control means of this invention is set forth below.

Before turning attention to the control apparatus of this invention, the general mode of operation of the inverter circuit of FIG. 1 will be described briefly. Let it be supposed initially that the gate controlled rectifier 10 is conducting current to the load 32 from the upper half of the DC supply 14 and that the capacitor 26 is charged with the junction 50 positive with respect to the junction 28, the charge having been acquired during previous operation. To commutate the controlled rectifier 10, the gate controlled rectifier 16 is fired by means of a suitable firing pulse supplied thereto from the control apparatus 36 through connection 42. The firing of the controlled rectifier 16 thus connects a series oscillatory circuit including the capacitor 26 and the inductance 24 across the controlled rectifier. A current pulse produced by the discharging series oscillatory circuit builds up to exceed the load current (assumed to flow from junction 30 to junction 34 at this time), the current pulse taking over the function of supplying load current to the load 32 and causing the diode rectifier 20 to be forward biased and the controlled rectifier 10 to be reversely biased. The reverse bias across the controlled rectifier 10 lasts for a period greater than the turn-off time of the controlled rectifier 10 so that the controlled rectifier 10 is turned "off," thereby regaining its blocking mode of operation. The commutating capacitor 26 is finally charged to the opposite polarity so that the junction 28 becomes more positive than the positive terminal of the DC source 14 and the controlled rectifier 16 is biased off. The capacitor 26 is now ready to commutate the gate controlled rectifier 12 upon subsequent firing of the gate controlled rectifier 18.

Figure 2A:
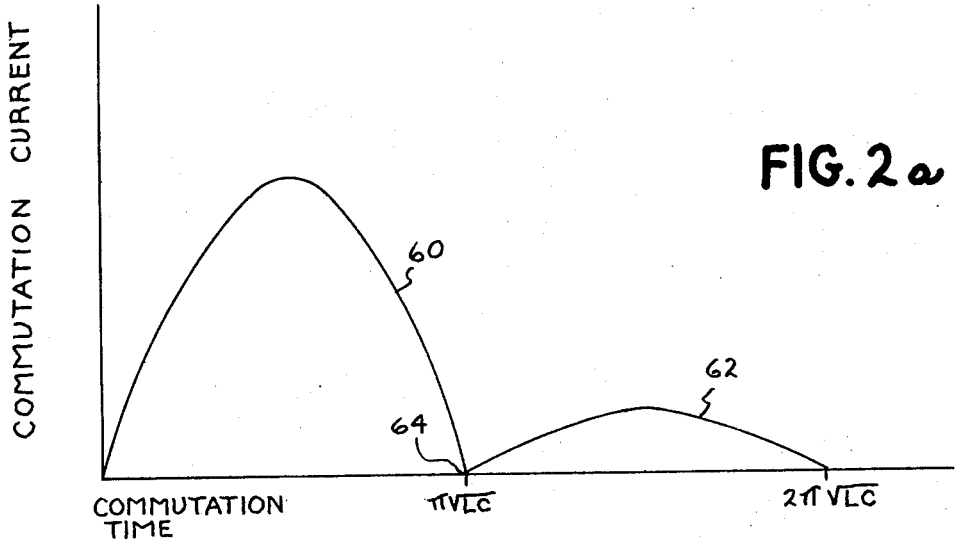
FIG. 2a illustrates commutation current flow in an inverter power circuit of the type illustrated by FIG. 1 under zero load without being controlled in accordance with this invention.
Figure 2B:
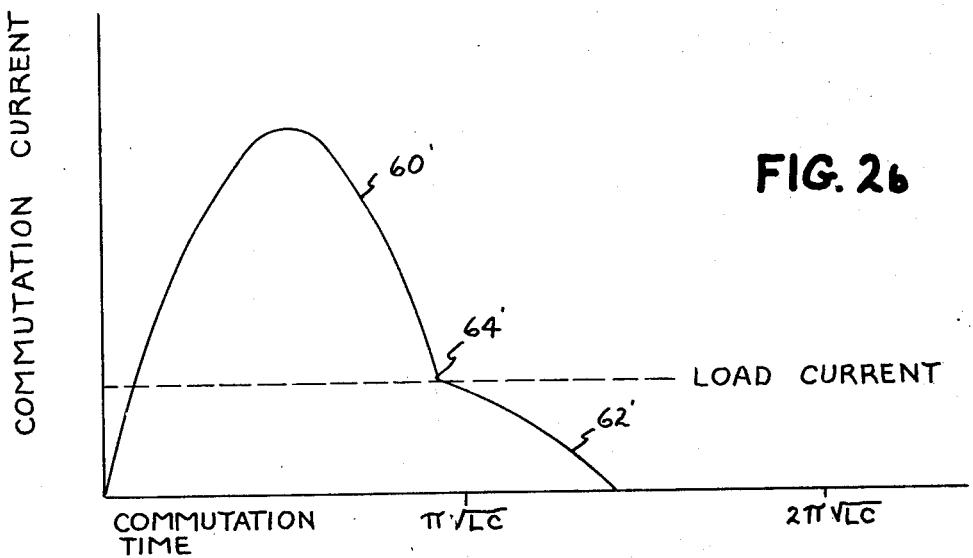
FIG. 2b illustrates commutation current flow in an inverter power circuit of the type illustrated by FIG. 1 under an inductive load condition without being controlled in accordance with this invention.

Referring now to FIGS. 1 and 2a, the buildup and decay of the commutation current under no load conditions when commutating controlled rectifier 10 has, prior to the present invention, normally followed the path labeled 60 in FIG. 2a. Under such conditions, the practice has been to fire or turn "on" the gate controlled rectifier 12 by means of a suitable firing signal supplied through connection 40 when the commutation current returns to zero at point 64. A second and smaller pulse of commutation current (labeled 62 in FIG. 2a) then flows through the series oscillatory circuit to make up losses incurred during the first pulse 60 and complete the charging of the capacitor 26 with reverse polarity, the controlled rectifier 16 then ceasing to conduct. Under these conditions, the controlled rectifier 12 is fired after about $\pi \sqrt{LC}$ seconds, or one-half cycle of oscillation between the capacitor 26 and the inductance 24 after the firing of the controlled rectifier 16. The total commutation time is thus about $2\pi \sqrt{LC}$ seconds. With inductive loads, however, the diode rectifier 22 will conduct after the commutation current falls along path 60' (FIG. 2b) to the actual load current at 64', the subsequent capacitor charging current being represented by path 62'. Through a comparison of FIGS. 2a and 2b, it will be appreciated that time of these prior art inverter circuits is load dependent in that maximum commutation time is required at no load as illustrated by FIG. 2a with lesser time required for higher loads as illustrated by FIG. 2b.

Figure 2C:
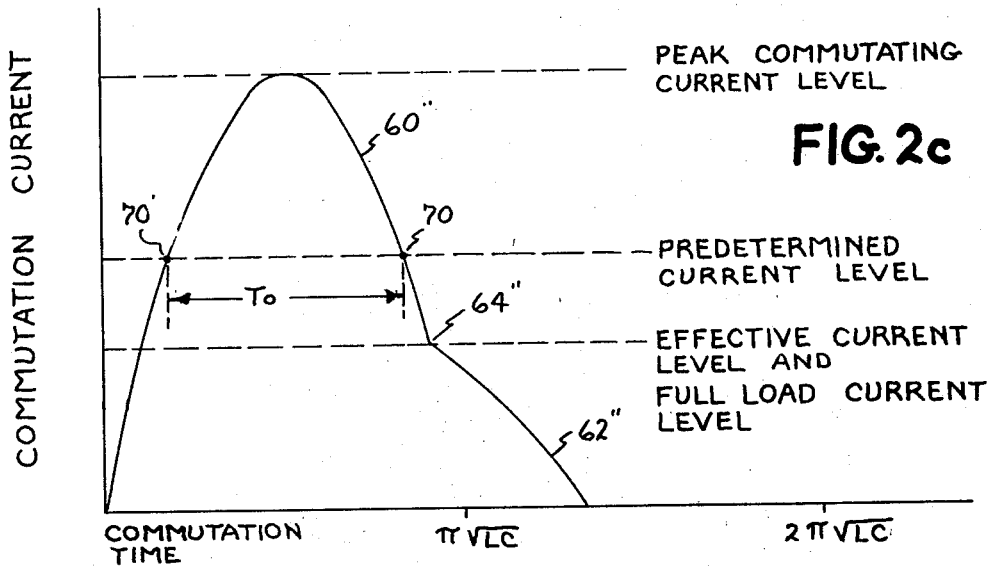
FIG. 2c illustrates commutation current flow in the inverter power circuit of FIG. 1 under zero load as controlled in accordance with this invention.

As indicated previously, it is sometimes desirable to maintain the commutation period relatively short even at low load levels. This is accomplished in accordance with the present invention by providing means for sensing the actual commutation current and firing the other load rectifier, e.g., controlled rectifier 12 when commutating controlled rectifier 10, when the commutation current decays to a predetermined level as illustrated by point 70 of FIG. 2c. Because of inductance in inverter circuits of the type illustrated by FIG. 1, the current resulting from firing the controlled rectifier 12 is delayed until the commutation current decays still further to point 64". Thus, to achieve a commutation period equal to that normally corresponding to a given load condition, it is necessary to fire the other load rectifier at a predetermined current level that is substantially higher than the commutation current level corresponding to the given load condition. On the other hand, the predetermined current level should not be selected so high that the time $T_o$ as shown by FIG. 2c is less than the turn-off time of the controlled rectifier 10.

A major consideration in selecting the predetermined current level at which the other load rectifier is fired is the so-called "pump-up" action of the inverter circuit. As the firing pint of the other load rectifier is advanced, or as load current is increased, the effect of point 30 in FIG. 1 being switched from the positive voltage polarity (in the case of commutating off load rectifier 10) to the negative voltage polarity earlier in the commutation interval, produces an increase in energy stored in the commutating capacitor 26 during the remainder of the commutation interval. If this additional energy storage exceeds that amount of energy lost during the commutation interval due to IR losses, the commutating capacitor voltage is increased over its previous state. The higher commutating capacitor voltage produces a higher commutating current during the next commutating interval, and this "pump-up" action continues until the additional energy storage, as determined either by the firing point of the other load rectifier or by the load current level, equals the additional commutating losses due to the higher commutating current. The amount of "pump-up" action is a function of the ratio of the effective current level (point 64" in FIG. 2c) to the peak commutating current level, the effective current level being determined either by the firing of the other load rectifier at the predetermined current level or by the load current level being equal to the effective current level. The amount of "pump-up" can be made completely independent of load by making the effective current level higher than the highest load current level. However, this results in higher commutation energy and losses than necessary at lighter loads. A more practical selection as illustrated by FIG. 2c is to select the effective current level to be about equal to full load current level and allow additional "pump-up" on overloads. It will, however, occur to those skilled in the art that the effective current level can be more or less than the full load current level so long as the predetermined current level remains within the range established below.

Since in practice the firing point of the other load rectifier in the commutating interval will determine both the commutating time and commutating energy level, it is desirable that it be closely controlled to optimize circuit component stresses and commutating losses. If this firing point is set by a time delay from the start of commutation as heretofore proposed, wide variations in commutation time and "pump-up" are possible due to commutation component tolerances and variations, DC bus voltage variations, or time delay variations. However, if the firing point is determined by detecting the level of the commutating current in accordance with the present invention, a self regulating action is obtained. If the peak commutation current were to increase, due to a commutation component variation for example, then the ratio of the firing current level and the peak current level would decrease, resulting in less "pump-up" action and reducing the commutation current. On the other hand, if the commutation current were to be decreased, the ratio of firing current level to peak current level would increase, producing more "pump-up" action to counter the original variation. This self regulating action is effective for variations in both the magnitude and time of the commutating pulse, and maintains the commutation energy within a desired range for satisfactory inverter operation. In practice, it has been found that sufficiently short commutation periods can be obtained when the predetermined current level is selected to be 25 percent or more of the peak commutating current level, and that commutation "pump-up" action is limited to reasonable levels when the predetermined current level is selected to be 50 percent or less of the peak commutation current level. In accordance with the invention, the predetermined current level is selected within this range, the optimum point within the range being dependent on commutation loss and rate of rise of load current considerations relating to the particular application of the inverter circuitry.

Figure 3:
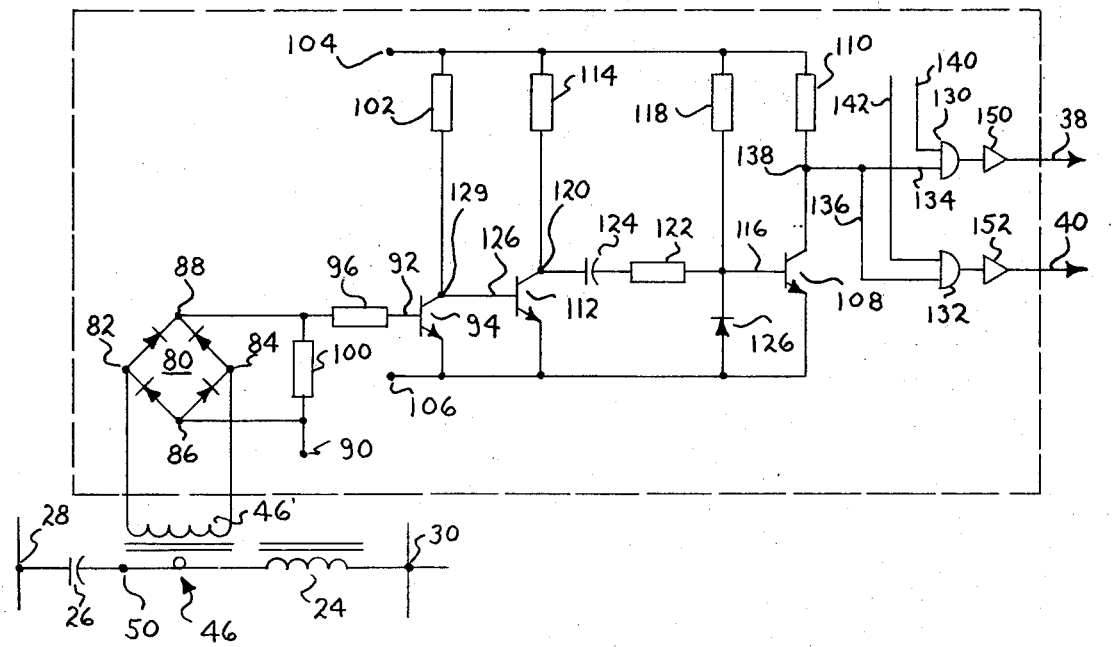
FIG. 3 is a schematic representation of a preferred form of the commutation control apparatus of FIG. 1.

Referring now to FIGS. 1 and 3, the commutation control means for sensing the commutation current and for firing the other load rectifier (controlled rectifier 12 following commutation of controlled rectifier 10 and controlled rectifier 10 following commutation of controlled rectifier 12) will be described in detail, the commutation control means of the invention being included in the commutation control apparatus 36 of FIG. 1. The commutation current sensing means includes the current transformer 46 and a rectifying diode bridge 80 having junctions 82 and 84 connected across the transformer 46. The other junctions 86 and 88 of the bridge 80 are respectively connected to source 90 of relatively negative direct current electric power and the base 92 of an NPN-transistor 94 through a resistor 96. A resistor 100 is connected between the terminal 90 and the junction 88 of the bridge 80. During commutation, commutation current flow in the series oscillatory circuit including the capacitor 26 and the inductance 24 produces a proportional flow of current in the secondary 46' of the current transformer 46. Current flow from the secondary 46' of the transformer is rectified by the bridge 80 and loaded by the resistance of resistors 100 and 96 so that a unidirectional variable voltage signal proportional to actual variations in the commutation current is supplied to the base 92 of the transistor 94 regardless of the direction of the commutation current. The various components including the resistors 96 and 100 and the current transformer 46 are selected in accordance with the voltage of the source 90 and the characteristics of the transistor 94 such that the variable voltage signal supplied to the base 92 of the transistor 94 is sufficient to turn on the transistor whenever the actual commutation current is equal to or greater than the predetermined current level, but is insufficient to turn on the transistor when the actual commutation current is less than the predetermined current level.

Still referring to FIGS. 1 and 3, the means for turning on the other controlled load rectifier in response to the variable current signal includes the transistor 94 and a resistor 102 connected in series across a source of DC electric power having a relatively positive terminal 104 and a lower potential terminal 106, the potential at terminal 106 being higher than the relatively negative potential of junction 90. Another NPN-transistor 108 and a resistor 110 are connected in series across the terminals 104 and 106, and still another NPN-transistor 112 and a resistor 114 are connected in series across the terminals 104 and 106. The emitters of the transistors 94, 108, and 112 are connected to the terminal 106. The base 116 of the transistor 108 is connected to the terminal 104 of the power supply through a resistor 118 and to the junction 120 of the transistor 112 and the resistor 114 through a resistor 122 and a capacitor 124 connected in series with the resistor 122 adjacent the base 116. A diode rectifier 126 is connected between the base 116 of the transistor 108 and the power supply terminal 106 with its cathode adjacent the base 116. The base 126 of the transistor 112 is connected to the junction 129 between the transistor 94 and the resistor 102. A pair of AND-gates 130 and 132 have input legs 134 and 136, respectively, connected to a junction 138 between the resistor 110 and the transistor 108. A second input leg 140 of the AND-gate 130 is connected to suitable means for supplying thereto an inhibit signal of relatively long duration during commutation of the controlled rectifier 10 and firing of controlled rectifier 12, and a second input leg 142 of the AND-gate 132 is connected to suitable means for supplying thereto an inhibit signal of relatively long duration during commutation of the controlled rectifier 12 and firing of controlled rectifier 10. In accordance with the present invention, a firing signal pulse is produced at junction 138 when the commutation current decays to a predetermined level (see 70 of FIG. 2c), and the logic network including AND-gates 130 and 132 directs the firing signal pulse to the controlled rectifier not undergoing commutation over the appropriate one of connections 38 and 40, amplifiers 150 and 152 being provided in the connections 38 and 40, respectively, to amplify the signals to a level required for firing of the controlled rectifiers.

The operation of the means for turning on the other controlled rectifier will now be described. Assuming that controlled rectifier 10 is to be commutated and that commutating rectifier 16 has been turned on, the commutation current will initially be less than the predetermined current level, and the variable voltage signal supplied to the base 92 of the transistor 94 will be insufficient to turn on the transistor. Consequently, transistor 112 will be turned on and conducting since its base 126 is connected to the positive power supply terminal 104 through resistor 102. Under these conditions, junction 120 is maintained essentially at the potential of the power supply terminal 106. Transistor 108 is also initially turned on since its base 116 is connected to the terminal 104 through resistor 118, thereby maintaining junction 138 at essentially the potential of terminal 106. This potential must be less than sufficient to enable the AND-gates 130 and 132. When the commutation current builds up to the predetermined current level (point 70' of FIG. 2c), the variable voltage signal supplied to the base 92 of the transistor becomes sufficient to turn on the transistor 94 and thereby connect the base 126 of the transistor 112 to essentially the potential of the terminal 106. As a result, transistor 112 will stop conducting, and the capacitor 124 will charge until the junction 120 reaches the potential of terminal 104. When the commutation current decaying along path 60" of FIG. 2c reaches the predetermined current level at point 70, the variable voltage signal will become insufficient to maintain conduction through the transistor 94. As a result, transistor 112 will be turned back on, and the capacitor 124 will rapidly discharge through the transistor 112 since the junction 120 will be essentially connected to the terminal 106 of the power supply. The rapid discharge of the capacitor 124 will momentarily drop the voltage supplied to the base 116 of the transistor 108 below that required for continued conduction. The turning off of transistor 108 will result in a rapid increase in potential at junction 138, and this increased potential will be transmitted through the AND-gate 132 to turn "on" the controlled rectifier 2. Immediately following discharge of the capacitor 124, a sufficient turn-on voltage will be reestablished at the base 116 of the transistor 108, and the voltage at junction 138 will fall again to that of terminal 106. It will thus be appreciated that a firing signal pulse is produced at the junction 138 for turning on the noncommutated controlled rectifier when the commutation current decays to a predetermined level. In effect, the transistor 108 is a voltage responsive switching device permitting current flow therethrough when the voltage supplied to its base 116 is sufficient to turn it on and preventing current flow therethrough when the voltage supplied to its base is insufficient to turn it on.

It will, of course, be obvious to those skilled in the art that the values of the various elements comprising the circuitry illustrated by FIG. 3 must be selected properly in order to provide operation as just described. In one embodiment of the invention, a power supply providing +5 volts at terminal 104, 0 volts at common terminal 106, and −5 volts at terminal 90 was provided. The transistor 94 was a JEDEC No. 2N3415, and the components of the current sensing means were selected such that 0.6 volt was supplied to the base 92 of the transistor 94 at the predetermined commutation current level. In this particular embodiment, the resistors 102, 110, 114, 118, and 122 had resistances of 10K; 10K; 1K; 10K; and 1 kΩ, respectively. The transistor 112 was a JEDEC No. 2N3415 and the transistor 108 was a JEDEC No. 2N3415. The diode rectifier 126 was a No. 1N4148, and the capacitor 124 was rated at 0.02 microfarad. In the event that another power supply is used or if it is desired to produce the firing signal pulse at some other predetermined current level, appropriate changes in the elements would have to be made.

Although this invention has been described in connection with a preferred embodiment, it will occur to those skilled in the art that many modifications and variations are possible without departing from the spirit and scope of the invention. For example, although the invention has been described in connection with the commutation of a single phase inverter circuit, it is equally applicable to use in the commutation of polyphase inverter systems. Furthermore, alternative circuits will occur to those skilled in the art. For example, the illustrated transistors could be replaced by other switching devices turned on and off at the appropriate times by suitable control means. Accordingly, it is intended that these and other modifications of the invention be included within the scope of the appended claims.

What is claimed as new and is desired to secure by Letters Patent of the United States is:

1. In an inverter circuit including at least one set of two series connected load current carrying gate controlled rectifiers connected across a source of direct-current electric power, a respective set of two series connected commutating gate controlled rectifiers of similar polarity connected across said source of electric power, a capacitor and an inductor connected in series circuit relationship between the junction of said two load current carrying gate controlled rectifiers and the junction of said two commutating gate controlled rectifiers, a set of two diode rectifiers each connected in parallel circuit relationship across a respective one of said load current carrying gate controlled rectifiers in reverse polarity with respect to said gate controlled rectifier, and means for operatively connecting a load between said junction of said two load current carrying gate controlled rectifiers and said source of electric power; commutation control means comprising:

means for sensing commutation current during commutation of either one of said load current carrying gate controlled rectifiers, and means responsive to said current sensing means for turning on the other one of said load current carrying gate controlled rectifiers when the commutation current decays to a predetermined level.

2. Commutation control means as defined by claim 1 in which said predetermined commutation current level is less than the peak commutation current level and is at least 25 percent of peak commutation current.

3. Commutation control means as defined by claim 1 in which said predetermined commutation current level is less than the peak commutation current level and is within the range of 25 to 50 percent of peak commutation current.

4. Commutation control means as defined by claim 1 in which said current sensing means produces a substantially continuous output signal having a magnitude which varies in accordance with variations in said commutation current such that said output signal constitutes a variable voltage signal, said means for turning on said other load current carrying gate controlled rectifier receiving said variable voltage signal and producing in response thereto a firing signal pulse when said commutation current decays to said predetermined level.

5. Commutation control means as defined by claim 4 in which said means for turning on said other load current carrying gate controlled rectifier comprises:

a resistive circuit connected across a source of direct current electric power, said resistive circuit including switching means having current blocking and current conducting states, means connected to said switching means for shifting said switching means between said two states, said shifting means normally maintaining said switching means in a selected one of said states and being responsive to said variable voltage signal to shift said switching means to the other of said states only when said commutation current decays to said preselected level and to rapidly thereafter shift said switching means back to said selected state, said firing signal pulse being produced at a preselected point in said resistive circuits as a result of said rapid shifting.

6. Commutation control means as defined by claim 4 in which said switching means is responsive to an electrical control signal produced by said shifting means, said switching means assuming one of its conductive states when the electrical control signal exceeds a predetermined level and the other of its states when the electrical control signal is less than said predetermined level, said shifting means further comprising:

an energy storage device, means responsive to said variable current signal for charging said energy storage device in a predetermined polarity when said commutation current exceeds said preselected level and for rapidly discharging said energy storage device when said commutation current falls below said preselected level, circuit means interconnecting said energy storage device, said switching means, and a source of direct-current electric power such that the electrical control signal supplied to said switching means is less than said predetermined level only during rapid discharge of said energy storage device.

7. Commutation control means as defined by claim 6 in which said energy storage device is a capacitor.

8. Commutation control means as defined by claim 7 in which said switching means is a transistor having an anode, cathode, and a base, said circuit means being connected to said base to supply the electrical control signal thereto.

9. Commutation control means as defined by claim 4 in which said means for turning on said other load current carrying gate controlled rectifier comprises:

a pair of terminal means for connection across a source of direct-current electric power, first, second, and third resistance means each connected to a first one of said terminal means, first, second, and third transistors respectively interconnecting said first, second, and third resistance means and the second one of said terminal means, output means connected to the junction of said first resistance means and said first transistor, said current sensing means being connected to the base of said third transistor for supplying said variable current signal to the base of said third transistor, a circuit including capacitance connected between the junction of said second resistance means and said second transistor and the base of said first transistor, fourth resistance means interconnecting the base of said first transistor and said first terminal, and means interconnecting the base of said second transistor and the junction of said third resistance means and said third transistor.

10. Commutation control means as defined by claim 9 in which said current sensing means produces a variable current signal sufficient to turn on said third transistor only when said commutation current is equal to or greater than said predetermined level and in which said resistance means and said capacitance have values such that (a) said second transistor is turned on when said third transistor is turned off and is turned off when said third transistor is turned on, (b) said capacitor is charged when said second transistor is turned off and is rapidly discharged through said second transistor when said second transistor is turned on, and (c) said transistor is turned off only during rapid discharge of said capacitance, whereby said capacitance is charged when said commutation current is equal to or greater than said predetermined level and is rapidly discharged to produce said firing signal pulse at said output means when said commutation current falls below said predetermined level.

11. Commutation control means as defined by claim 10 in which said predetermined commutation current level is less than the peak commutation current level and is at least 25 percent of peak commutation current.

12. Commutation control means as defined by claim 10 in which said predetermined commutation current level is less than the peak commutation current level and is within the range of 25 to 50 percent of peak commutation current.

13. Commutation control means as defined by claim 10 in which said output means included logic means for directing said firing signal pulse to said other one of said load current carrying gate controlled rectifiers.

14. Commutation control means as defined by claim 10 in which said current sensing means includes rectifying means for producing a unidirectional variable current signal regardless of the direction of the commutation current.

* * * * *

PO-1050
(5/69)

United States Patent Office
CERTIFICATE OF CORRECTION

Patent No. 3,641,421  Dated February 8, 1972

Inventor(s) Carlton Eugene Graf; Einar Aasen Skogsholm; Werner Karl Volkmann

It is certified that error appears in the above-identified patent and that said Letters Patent are hereby corrected as shown below:

Column 8, line 37 "4" should be corrected to -- 5 -- so that this line reads as follows:

"6. Commutation control means as defined by claim 5 in"

Signed and sealed this 30th day of May 1972.

(SEAL)
Attest:

EDWARD M. FLETCHER, JR.
Attesting Officer

ROBERT GOTTSCHALK
Commissioner of Patents